May 13, 1924.
W. W. VENABLE
CAR
Filed July 31, 1923  2 Sheets-Sheet 1
1,493,576
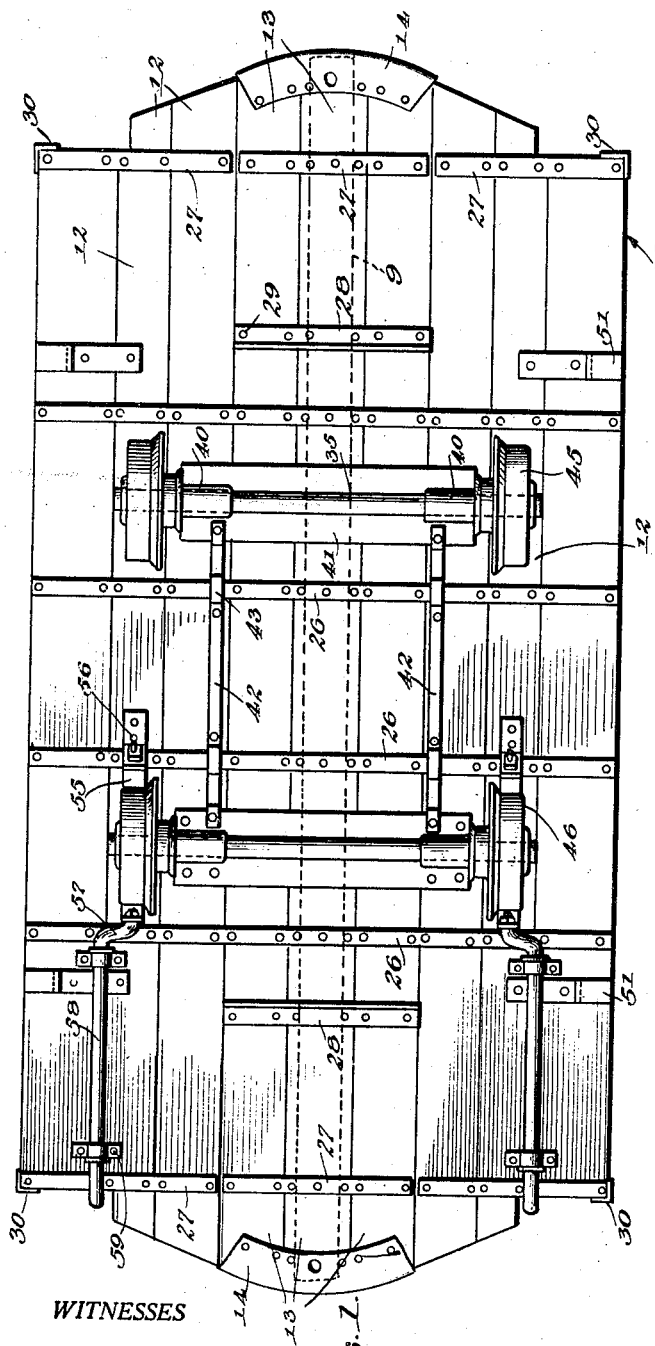
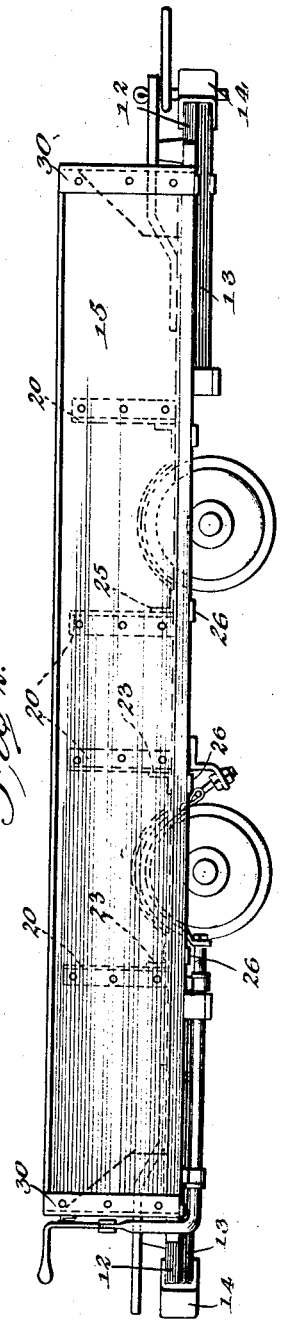
WITNESSES
INVENTOR
W. W. Venable,
BY
ATTORNEYS May 13, 1924.
W. W. VENABLE
CAR
Filed July 31, 1923
1,493,576
2 Sheets-Sheet 2
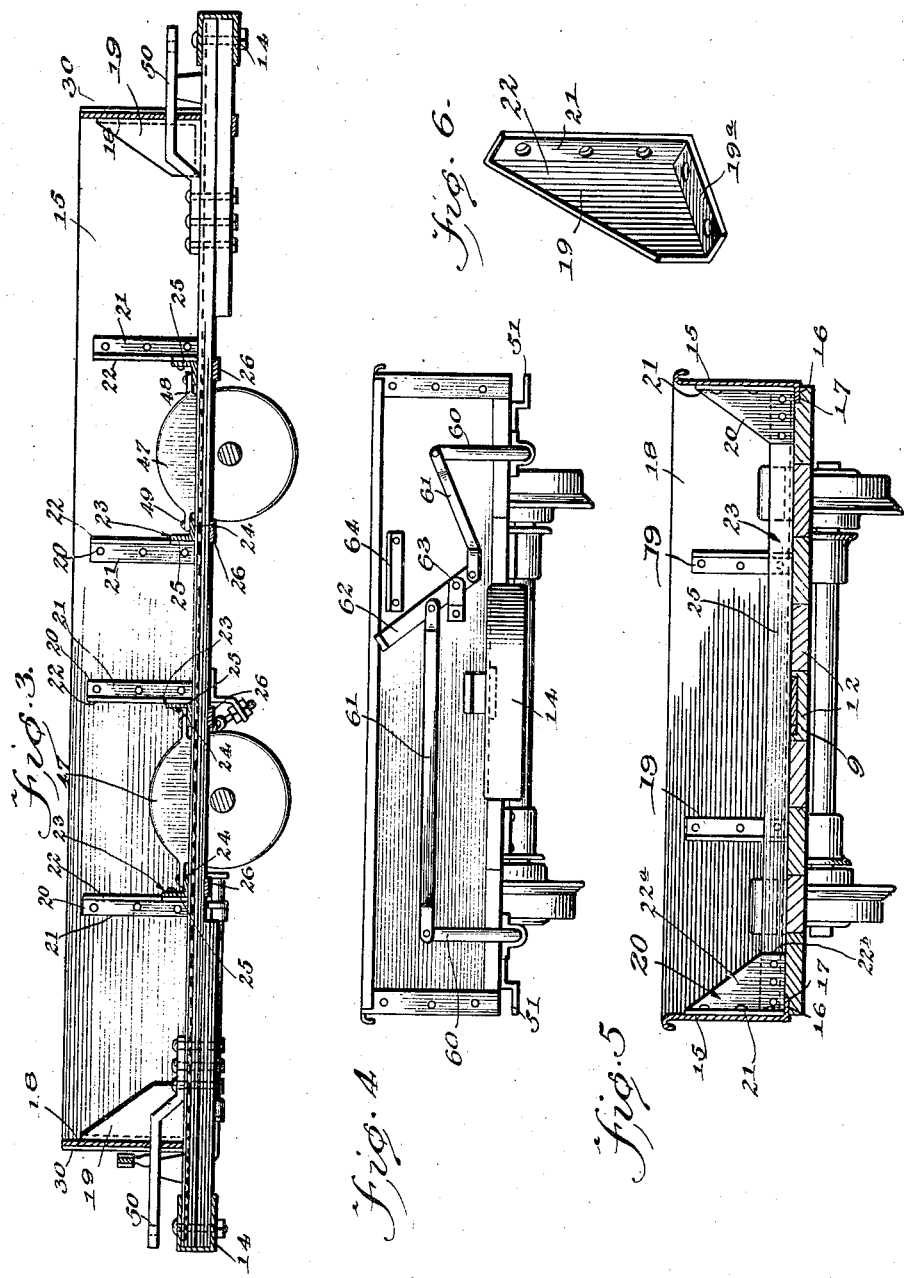
WITNESSES
INVENTOR
W. W. Venable,
BY
ATTORNEYS Patented May 13, 1924.

1,493,576

UNITED STATES PATENT OFFICE.

WILLIAM WALTON VENABLE, OF CHARLESTON, WEST VIRGINIA.

CAR.

Application filed July 31, 1923. Serial No. 654,865.

*To all whom it may concern:*

Be it known that I, WILLIAM WALTON VENABLE, a citizen of the United States, and a resident of Charleston, in the county of Kanawha and State of West Virginia, have invented certain new and useful Improvements in Cars, of which the following is a specification.

This invention relates to improvements in cars of the type of mining cars or the like, and has for its object to provide a car which is strong and durable, and rigid in all respects and irrespective of the direction or manner in which strains and forces act upon it, the car at the same time having sufficient flexibility and resiliency to permit it to follow an uneven track.

A further object is to provide a car having these advantages and which may be manufactured from facilities and materials ordinarily available and at a comparatively slight cost and wherein the ratio of the strength of the car and its component parts to its weight is very high, the car being extremely strong and durable while of comparatively light weight.

Other objects and advantages of the invention reside in certain novel features of the construction, combination and arrangement of parts which will be hereinafter more fully described and particularly pointed out in the appended claims, reference being had to the accompanying drawings, in which:

Figure 1 is a bottom plan view of a car constructed in accordance with the present invention, Figure 2 is a view thereof in side elevation, Figure 3 is a view in longitudinal vertical section, Figure 4 is an end view, and Figure 5 is a view in transverse vertical section, Figure 6 is a detail perspective view of an end gusset.

Referring to the drawings wherein for the sake of illustration is shown the preferred embodiment of the invention, the numeral 10 designates generally the bottom of the car which is made up of a number of boards 12 laid together in edge to edge relation, and in assembly disposed in substantially the same horizontal plane. For the greater part of its extent the bottom comprises but a single layer of such boards 12, but at its ends and at the point to which the draft is applied reinforcing boards 13 are arranged on the underside of certain of the boards 12, three such reinforcing boards 13 being provided at each end of the car. Bumpers 14 comprising curved metallic plates of channel cross section are arranged at each end of the car and embrace and are secured to the adjacent portions of the boards 12 and 13, and assist in holding the boards 12 and 13 assembled as well as carrying out their function as bumpers.

A draw bar 9 extends from bumper to bumper, the draw bar being accommodated in a groove provided therefor in the bottom 10 and having its ends riveted to the bumpers 14 and its intermediate portions riveted to each angle bar 23 hereinafter described.

Metallic sides 15 are provided and extend along each side of the bottom, each side 15 having along its lower edge an in-turned flange 16 which is received in rabbeted or notched edges 17 of the side boards 12. Metallic ends 18 extend between the ends of the sides 15, and these ends and sides are organized and secured to each other and to the bottom in a novel and advantageous manner which will hereinafter more fully appear.

At regular intervals along each side 15 and along each end, and within the bed defined by the bottom, side and end, gussets are arranged and preferably four such gussets are provided for each side and two such gussets are provided for each end, the side gussets being designated generally at 20 and the end gussets at 19. These gussets are all of identical construction except as to one particular hereinafter pointed out, and each includes a vertical flange 21 of rectangular form which in the assembly is disposed flush against the side or end with which the gusset is associated, and a vertical flange 22 which extends at right angles to the flange 21 and which includes a portion 22ª of triangular formation and a portion 22ᵇ of rectangular formation. The flanges 22 of the gussets extend inwardly of the bed defined by the sides, ends and bottom, as shown in the drawings. The flanges 21 of the gussets are secured by rivets or other suitable fastening means to the side or end wall with which the gusset is associated and the rectangular portions 22ᵇ of the flanges 22 of the four gussets 20 which are associated with each side are riveted or otherwise suitably secured to transversely extending angle bars 23. The angle bars 23 extend from one side to the other of the bed of the car and include horizontal flanges 24 lying flush against the bottom boards 12 and vertical flanges 25 having portions lying flush against the rectangular portions 22$^b$ of the flanges 22 of the gussets secured to the sides and riveted or otherwise suitably secured to these rectangular portions. Below each transversely extending angle bar 23 and on the underside of the bottom is a flat washer bar 26, there being one such washer bar for each angle bar and the washer bars and angle bars being in vertical alinement. The washer bars are secured to the horizontal flanges 24 by bolts and nuts, rivets or other suitable fastening means which extend through the washer bars 26, the interposed boards 12, and the horizontal flanges 24 of the bars 23. Washers are preferably associated with the fastening means, especially if bolts and nuts are used. The washer bars 26 are of integral construction except the end washer bars which are designated at 27 and which are made up of a number of sections, this particular construction being made necessary by virtue of the fact that at the ends of the car the central portions of the bottom are made up of two layers of boards 12 and 13, as previously described. The lower ends of the gussets 19 are flanged as at 19$^a$ and the flanges 19$^a$ are suitably secured to the bottom boards.

As shown in Figure 1 the reinforcing boards 13 are held in position and organized with the bottom boards 12 by the bumpers 14 by sections of the washer bars 27 and by angle bar 28 suitably secured to the boards 13 and to the bottom boards 12 by fastening means 29. The corners of the car are rigidly connected by metallic corner pieces 30 of angular formation, the flanges of the corner pieces being secured or fastened to the end and side walls by rivets or other suitable fastening means. The metallic corner pieces or angles 30 extend down to overlap and protect the corners of the wooden bottom.

The running gear of the car includes axles 35 journaled in bearings 40 carried by bearing brackets or mounts 41 secured to the underside of the floor boards 12 and connected by connecting bars 42 which are secured to the bearing brackets 41 and to the floor boards 12 and which have offset portions 43 snugly fitting around the intervening washer bars 26. The axles 35 are placed close to the bottom of the car and the wheels 45 mounted on the axle are accommodated in part in openings 46 formed in the bottom boards 12, the parts of the wheels which rotate within the bed of the car being guarded and protected by guard or cap plates 47 arranged within the bed and secured in position by lugs 48 and fastening means 49. At each end, the car is equipped with draft bars 50 and along each side is provided with car dump attachments 51.

Braking means is provided for one pair of the wheels and includes brake bands 56 cooperable with the wheels of one pair and each brake band being pivotally connected at one end to a bracket 56 and pivotally connected at its opposite ends to a crank 57 of an operating shaft 58 provided for each brake band 56, and rotatably mounted, as at 59, on the underside of the car. The shafts 58 extend to the adjacent end of the car and at such end are provided with cranks 60 which are connected by links 61 to an operating lever 62 fulcrumed, as at 63, on the end wall of the car and cooperable with the toothed angle plate 64 for the purpose of holding the operating lever 62 in any position to which it may be adjusted.

I claim:—

1. In a car of the character described, a bottom comprising a number of boards laid together in edge to edge relation and having their upper side edges notched, metallic sides supported on the bottom and having their lower edges inturned and received in the notches of the bottom boards, end walls extending between the side walls and gussets associated with the side and end walls and each including angularly extending vertical flanges, one of which flanges of each gusset is disposed flush against and secured to the side or end wall with which the gusset is associated, and the other of which flanges of each gusset extends at right angles to the first flange, and a plurality of transversely extending angle bars arranged within the bed defined by the bottoms, side and ends with their horizontal flange lying flush against and secured to the bottom boards and with their vertical flanges engaging and secured to the angularly extending flanges of the gussets of the side walls, and washer bars disposed below the horizontal flanges of the angle bars and connected thereto.

2. In a car of the character described, a bottom comprising a number of boards laid together in edge to edge relation and having their upper side edges notched, metallic sides supported on the bottom and having their lower edges inturned and received in the notches of the bottom boards, end walls extending between the side walls and gussets associated with the side and end walls and including angularly extending vertical flanges, one of which flanges of each gusset is disposed flush against and secured to the side or end wall with which the gusset is associated and the other of which flanges of each gusset extends within the bed defined by the bottom, side and end walls, a plurality of transversely extending angle bars arranged within said bed with their horizontal flanges secured to the bottom boards and with their vertical flanges engaging and secured to the angularly extending flanges of the gussets secured to the side walls, washer bars disposed below the angle bars and connected thereto, and running gear for the car having axles disposed immediately below the bottom boards, the bottom boards having openings, said running gear also including wheels mounted on the axles and operating in part through the openings in the bottom, and cap plates arranged upon the bed and protecting and guarding the wheels.

3. In a car of the character described, a bottom comprising a number of boards laid together in edge to edge relation and having their upper side edges notched, metallic sides supported on the bottom and having their lower edges inturned and received in the notches of the bottom boards, end walls extending between the side walls and gussets associated with the side and end walls and each including angularly extending vertical flanges, one of which flanges of each gusset is disposed flush against and secured to the side or end wall with which the gusset is associated and the other of which flanges extend at right angles to the first flange, and a plurality of transversely extending angle bars arranged with the bed defined by the bottom, side and ends with their horizontal flanges lying flush against and secured to the bottom boards and with their vertical flanges engaging and secured to the angularly extending flanges of the gussets secured to the side walls.

4. In a car of the character described, a bottom, including a plurality of boards arranged in the same horizontal plane and laid against each other in edge to edge relation, sides and ends mounted on the bottom and secured to each other and to the bottom, and a plurality of reinforcing boards at each end of the car and arranged on the underside of the boards and constituting the bottom of the car, and means for securing said boards in position including curved bumpers comprising metallic plates of angular cross section embracing the adjacent portions of adjacent bottom boards and adjacent portions of the reinforcing boards and secured thereto.

WILLIAM WALTON VENABLE.